United States Patent
Coker et al.

[15] 3,704,345
[45] Nov. 28, 1972

[54] CONVERSION OF PRINTED TEXT INTO SYNTHETIC SPEECH

[72] Inventors: Cecil Howard Coker, Chatham Township, Morris County; Noriko Umeda, Summit, both of N.J.

[73] Assignee: Bell Telephone Laboratories, Incorporated, Murray Hill, Berkeley Heights, N.J.

[22] Filed: March 19, 1971

[21] Appl. No.: 126,200

[52] U.S. Cl. .................................... 179/1 SA
[51] Int. Cl. ................................... G10l 1/10
[58] Field of Search ............ 179/1 SA, 1 SB, 15.55 R; 35/35 A; 340/148–152

[56] References Cited

OTHER PUBLICATIONS

Flanagan, Synthetic Voices for Computers, IEEE, Oct. 1970, p. 22–45.

Rabiner, A Model for Synthesizing Speech by Rule, IEEE, Vol. AU–17, March 1969, p. 7–13.

*Primary Examiner*—Kathleen H. Claffy
*Assistant Examiner*—Jon Bradford Leaheey
*Attorney*—R. J. Guenther and William L. Keefauver

[57] ABSTRACT

A system is disclosed for converting printed text into speech sounds. Text is converted to alpha-numeric signal data, for example, by a scanner and dictionary lookup. Syntax of the input information is then analyzed to determine the proper phrase category, e.g., subject, verb, object, etc., of word intervals, and to assign pause, stress, duration, pitch and intensity values to the words. From these data a phonetic description of each word is found in a stored dictionary, modified by the accumulated data, and used to prepare synthesizer control signals.

9 Claims, 15 Drawing Figures

FIG. 7

| POSITION IN WORD | WORD-FINAL SYLLABLE | | | | | | | | | | | NON-FINAL | |
|---|---|---|---|---|---|---|---|---|---|---|---|---|---|
| PAUSE ENDING | STRONG CONTINUATION | | MODERATE CONTINUATION | | WEAK CONTINUATION | | FALL END | | NONE | | NONE | |
| FOCUS-NONFOCUS | F | N | F | N | F | N | F | N | F | N | F | N |
| ABSOLUTE STRESS | | | | | | | | | | | | |
| MAIN VOWELS | | | | | | | | | | | | |
| NEW NOUN | DI | D(2) | 1-2 | (2) | 2 | (2-3) | 3 | (6) | 6 | (7) | 7 | 7-5 |
| ADJECTIVE, ADVERB NEW VERB, PIVOTAL WORD | - | (2) | 1-2 | (2) | 2 | (2-3) | 3 | (6) | 6 | (7) | 7 | 7-5 |
| REPEATED NOUN | (1) | 3 | (1-2) | 3 | (2) | 3-4 | (3) | 6 | (6) | 7 | (7) | 7-5 |
| REPEATED VERB | (1) | 3 | (1-2) | 3 | (2) | 3-4 | (3) | 6 | (6) | 7 | (7) | 7-5 |
| SECOND PART OF COMPOUND WORD | - | 4 | - | 4 | - | 4-5 | - | 4-5 | - | 7-5 | - | 5 |
| INTERMEDIATE | (1) | 4 | (1-2) | 4-5 | (2) | 5 | 3 | 4-5 | 7 | 7-5 | 7 | 5 |
| FUNCTION | (1) | 4 | (1-2) | 4-5 | (2) | 5 | 3 | 5 | 7 | 5 | 7 | 5 |
| REDUCED | - | - | - | - | - | - | - | - | - | 5 | - | 5 |
| OTHERS | | | | | | | | | | | | |
| SECONDARY STRESS | - | 4 | - | 4-5 | - | 5 | - | 4-5 | - | 7-5 | - | 5 |
| UNSTRESSED | - | 4 | - | 4-5 | - | 5 | - | 5 | - | 5 | - | 5 |

FIG. 8

| | | Strong Continuation | | Moderate Continuation | | Weak Continuation | | Fall End | | None | | Non-Final None | |
|---|---|---|---|---|---|---|---|---|---|---|---|---|---|
| | ABSOLUTE STRESS | F | N | F | N | F | N | F | N | F | N | F | N |
| MAIN VOWELS | NEW NOUN | 200/100/170 | 180/100/170 | 200/100/140 | 180/100/140 | 180/120 | 180/120 | 200/100/60 | 180/100/60 | 200/100 | 180 | 200/100 | 180 |
| | ADJECTIVE, ADVERB, NEW VERB, PIVOTAL WORD | 200/100/170 | 170/100/170 | 200/100/140 | 170/100/140 | 180/120 | 170/120 | 200/100/60 | 170/100/60 | 200/100 | 170 | 200/100 | 170 |
| | REPEATED NOUN | 200/100/170 | 170/100/170 | 200/100/140 | 170/100/140 | 180/120 | 170/120 | 200/100/60 | 170/110/60 | 200/100 | 170 | 200/100 | 170 |
| | REPEATED VERB | 200/100/170 | 110/100/170 | 200/100/140 | 110/140 | 180/120 | 100/120 | 200/100/60 | 160/110/60 | 200/100 | 160 | 200/100 | 160 |
| | SECOND PART OF COMPOUND WORD | – | 110/110 | – | 110/140 | – | 100/120 | – | 140/60 | – | 140 | – | 140 |
| | INTERMEDIATE | 200/100/170 | 110/170 | 200/100/140 | 110/140 | 180/120 | 100/120 | 200/100/60 | 140/60 | 200/100 | 140 | 170 | 110 |
| | FUNCTION | 200/100/170 | 110/170 | 200/100/140 | 110/140 | 180/120 | 100/120 | 200/100/60 | 110/60 | 200/100 | 110 | 170 | 110 |
| | REDUCED | – | – | – | – | – | – | – | – | – | – | – | 100 |
| OTHERS | SECONDARY STRESS | – | 100/170 | – | 110/140 | – | 100/120 | – | 140/60 | – | 140 | – | 140 |
| | UNSTRESSED | – | 100/170 | – | 110/140 | – | 100/120 | – | 110/60 | – | 110 | – | 110 |

Column group header: WORD-FINAL SYLLABLE (Strong Continuation, Moderate Continuation, Weak Continuation, Fall End, None); NON-FINAL (None).

Row group labels (stub): POSITION IN WORD / PAUSE ENDING / FOCUS-NONFOCUS / ABSOLUTE STRESS.

| FOLLOWING CONSONANTS \ VOWEL | I,ʌ | ɛ,ʊ | ɝ | ɑ,ɔ | æ | i,o,u | DIPTHONG | VOWEL PLUS ɝ |
|---|---|---|---|---|---|---|---|---|
| UNVOICED STOP | —,— | 3,3 | 3,3 | 3,3 | 3,2 | 5,5 | 7,7 | 5,2 |
| OTHER UNVOICED | —,— | 4,4 | 4,4 | 4,4 | 4,4 | 6,6 | 7,7 | 5,4 |
| VOICED STOP | 2,2 | 5,4 | 5,5 | 5,5 | 5,5 | 7,7 | 8,8 | 5,6 |
| VOICED FRICATIVE NASAL, LIQUID | 2,2 | 5,4 | 6,6 | 6,6 | 6,6 | 8,8 | 8,8 | 6,6 |
| OTHER CONDITION | 2,2 | 6,5 | 7,6 | 7,6 | 7,6 | 8,8 | 9,8 | 7,6 |

| | | | | | | | | |
|---|---|---|---|---|---|---|---|---|
| UV ST | —,— | 3,3 | 3,2 | 3,2 | 3,2 | 5,4 | 7,6 | 5,2 |
| OTHER UV | —,— | 4,4 | 4,3 | 4,3 | 4,3 | 6,5 | 7,6 | 5,4 |
| V ST | 2,2 | 5,4 | 5,4 | 5,4 | 5,4 | 7,6 | 8,7 | 5,6 |
| V FR N, L | 2,2 | 5,4 | 6,5 | 6,5 | 6,5 | 7,7 | 8,7 | 6,6 |
| OTHER | 2,2 | 6,5 | 6,6 | 6,6 | 6,6 | 8,1 | 9,8 | 7,6 |

| | | | | | | | | |
|---|---|---|---|---|---|---|---|---|
| UV ST | —,— | 2,2 | 2,2 | 2,2 | 2,2 | 4,4 | 6,6 | 5,2 |
| OTHER UV | —,— | 4,2 | 4,2 | 4,2 | 4,2 | 5,5 | 6,6 | 5,4 |
| V ST | 2,2 | 4,4 | 4,4 | 4,4 | 4,4 | 6,6 | 7,7 | 5,5 |
| V FR N, L | 2,2 | 5,4 | 5,4 | 5,4 | 5,4 | 6,6 | 7,1 | 5,6 |
| OTHER | 2,2 | 5,6 | 5,6 | 5,6 | 5,6 | 7,7 | 8,8 | 5,6 |

| FOLLOWING CONSONANT \ VOWEL | I ʌ | ɛ ʊ | ɝ | a ɔ | æ | i̊ oʊ | DIPH | V+ɚ |
|---|---|---|---|---|---|---|---|---|
| UV  ST | 4 | 6 | 6 | 6 | 6 | 3,3 | 5,5 | 4,2 |
| OTHER  UV | 5 | 7 | 7 | 7 | 7 | 4,4 | 6,6 | 4,2 |
| V  ST | 6 | 8 | 8 | 8 | 8 | 5,5 | 7,7 | 4,4 |
| V  FR N, L | 6 | 8 | 8 | 8 | 8 | 5,5 | 8,8 | 4,4 |
| OTHER | 6 | 8 | 8 | 8 | 8 | 6,6 | 8,8 | 5,4 |

| FOLLOWING CONSONANT \ VOWEL | I ʌ | ɛ ʊ | ɝ | a ɔ | æ | i̊ oʊ | DIPH | V+ɚ |
|---|---|---|---|---|---|---|---|---|
| ALL CONDITIONS | 4 | 4 | 4 | 4 | 4 | -- | 2,2 | -- |

| | | | | | | | | |
|---|---|---|---|---|---|---|---|---|
| UV  ST | 5 | 6 | 7 | 7 | 7 | 3,3 | 5,5 | 5,2 |
| OTHER  UV | 5 | 6 | 7 | 7 | 7 | 4,4 | 5,5 | 5,2 |
| V  ST | 5 | 6 | 8 | 8 | 8 | 5,5 | 6,6 | 5,4 |
| V  FR N, L | 5 | 6 | 8 | 8 | 8 | 5,5 | 6,6 | 5,4 |
| OTHER | 5 | 6 | 8 | 8 | 8 | 6,6 | 7,7 | 5,6 |

| FOLLOWING CONSONANT \ VOWEL | I ʌ | ɛ ʊ | ɝ | a ɔ | æ | i̊ oʊ | DIPH | V+ɚ |
|---|---|---|---|---|---|---|---|---|
| UV  ST | 5 | 5 | 6 | 6 | 6 | 2,2 | 5,5 | 4,2 |
| OTHER  UV | 5 | 5 | 6 | 6 | 6 | 3,3 | 5,5 | 4,2 |
| V  ST | 5 | 6 | 7 | 7 | 7 | 4,4 | 6,6 | 5,2 |
| V  FR N, L | 5 | 6 | 7 | 7 | 7 | 4,4 | 6,6 | 5,2 |
| OTHER | 5 | 6 | 7 | 7 | 7 | 5,6 | 6,6 | 5,2 |

CONVERSION OF PRINTED TEXT INTO SYNTHETIC SPEECH

This invention concerns the synthesis of speech signals from non-vocal input data, and more particularly to the production of nearly natural sounding speech directly and automatically from ordinary English text.

BACKGROUND OF THE INVENTION

1. Field of the Invention

With the increased use of automated equipment for translating between various forms of data, it is evident that a direct conversion from audible speech to the printed form or from the printed form to audible speech would avoid numerous intermediate conversion steps and provide great versatility. Such things as automatic information services, computer based instruction systems, reading machines for the blind, and spoken status reports from aircraft and space vehicle systems or the like, would benefit. Vast amounts of information would be only as far away as the closest pushbutton telephone. For example, a physician sitting in his office might need information on some obscure disease. It would be convenient if he could dial a computer, key in a reference number, and hear a page or two "read" to him out of a medical encyclopedia. A prospective air traveler wound be able to dial a computer, enter destination and desired departure time, and have a computer make combinational searches through time tables and report the convenient connecting flights verbally to him.

For such applications, a computer must have a large and flexible vocabulary. It must, therefore, store sizeable quantities of speech information and it must have the information in a form amenable to the production of a great variety of messages. Significantly, speech generated by the machine must be as intelligible as natural speech but it need not necessarily sound like any particular human. It may even be permitted to have a machine accent.

2. Description of the Prior Art

Voice response units are already in use in a number of limited-vocabulary applications, for example in automatic answer-back telephone systems. Present techniques generally employ prerecorded messages which are stored and accessed on demand. The limitations of storage and vocabulary size seriously restrict the usefulness of such equipment.

In the field of speech synthesis, a number of proposals have been made for energizing a speech synthesizer from phoneme input data representative of printed text. Yet, because in these systems a skilled operator must manually convert text into phoneme form prior to processing, they are largely impractical. Moreover, even with an input prepared in phoneme form by a human operator, additional processing is necessary to link the phonemes together to form a usable synthesizer input signal. Some advantage is gained by storing parametric data representative of a vocabulary of spoken information, prepared at leisure by a human operator, and then using the stored data to assemble synthesizer signals on command. However, if parametric data are stored in the numerous contextual forms required for human sounding speech, an excessively large storage capacity is required. For example, a typical desk size abridged dictionary lists more than 30,000 words. If the storage form is PCM or formant encoded words, and the dictionary is expanded to include variations of most entries as pronounced with different endings, prefixes, and the like, the necessary dictionary store may easily contain 5 or 6 times as many entries. With formant storage, the dictionary is still large and limited in use.

Accordingly, it is a primary object of this invention to convert English text into natural sounding speech in an economic manner. It is another object of the invention to prepare English text signals for storage in a compact and versatile form. It is yet another object of the invention to convert printed English text automatically into sequences of phonetic symbols which reflect sufficient information about the prosodic features of speech to enable the sequences of symbols to be utilized in synthesizing natural sounding speech.

SUMMARY OF THE INVENTION

Most simply stated, the text synthesis system of this invention receives English text from an input system, such as a teletypewriter system, text scanner, or the like, assigns stress and timing values to each detected word, finds a phonetic description of each word from a stored dictionary, and computes the phonetic parameters necessary for speech synthesis. No element of human speech is involved in these operations. It does depend, however, on certain prosodic information, i.e., on rules and constraints of human speech production and language, to direct and control the conversion from printed to phonemic signal form.

In accordance with the invention, a syntax analyzer and a dictionary, e.g., a stored assembly of phonetic data for a large vocabulary of words and their variations, are used to assign a phrase category such as subject, verb, object, and so on, to each word of the input text. Boundaries between phrases and clauses are located, and, in addition, the probability of or potential for a pause at every phrase boundary is evaluated. Each word is then assigned a stress value, and then a pitch contour using the assigned stress value and the pause probability data obtained from the syntax analyzer. In the last step of the prosody generation, each phoneme is assigned a representative value of duration, pitch and intensity that is compatible with the particular speech synthesizer used in the system.

Thus, the system of this invention converts printed text into speech sounds by performing certain manipulative operations on textual input data in accordance with stored rules and then prepares a detailed phonetic description of the desired vocal speech in a form which may be used directly to energize a speech synthesizer. Such synthesizers, well known in the art, are capable of producing audible speech whose naturalness is largely dependent on the nature of the input phonetic description.

The invention will be more fully apprehended from the following detailed description of an illustrative embodiment thereof taken in connection with the appended drawings.

BRIEF DESCRIPTION OF THE DRAWING

FIG. 7 is a tabulation of references to the duration value tables shown in FIGS. 9 through 15;

FIG. 8 is a table of pitch control values; and

FIGS. 9 through 15 constitute a number of tables of duration values for different contextual situations which are used in the practice of the invention.

DETAILED DESCRIPTION

Figure 1:
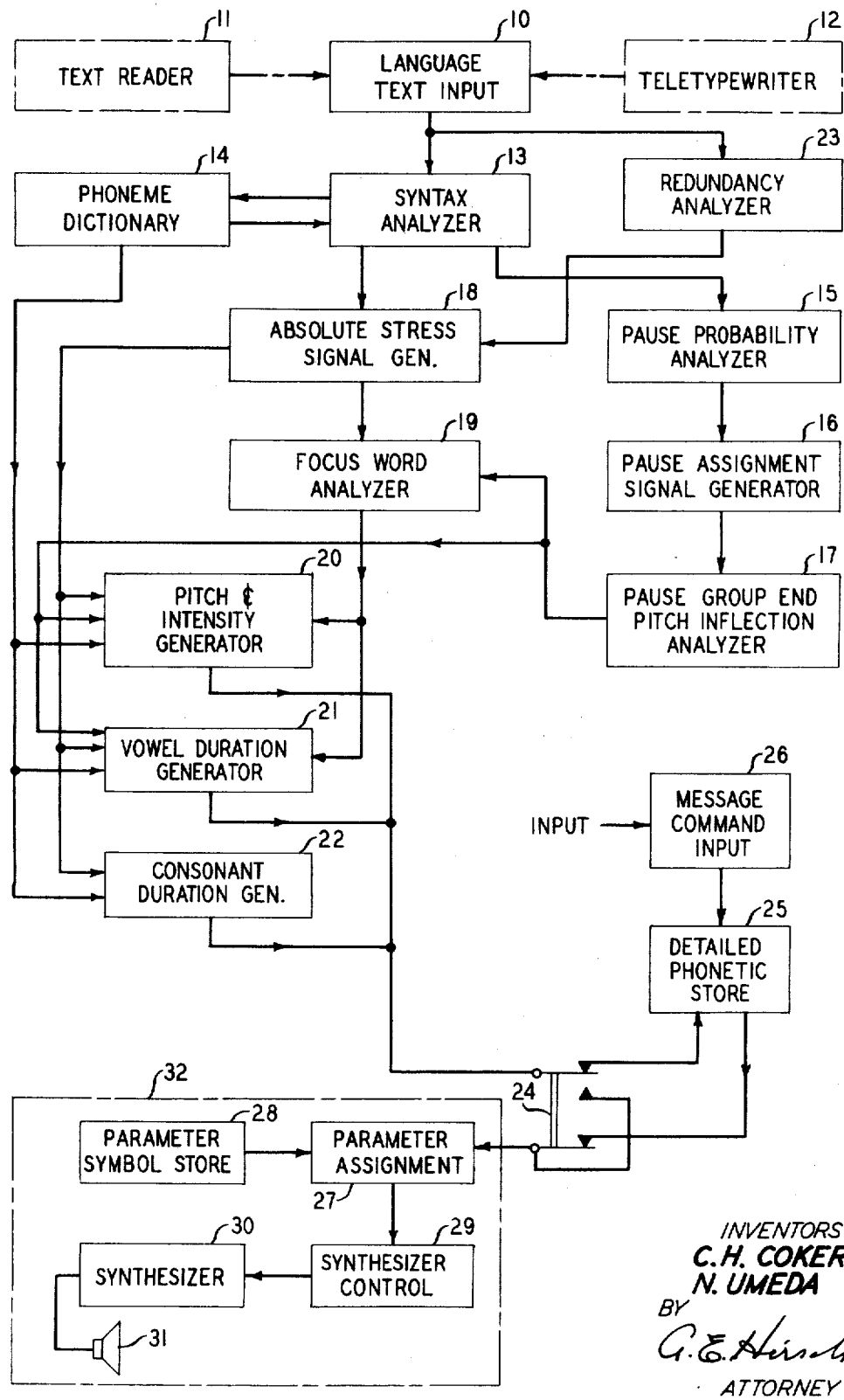
FIG. 1 is a schematic block diagram of a system, in accordance with the invention, for converting printed English text into discrete phonetic symbols for storage or the synthesis of artificial speech.

FIG. 1 illustrates in schematic block diagram form a system in accordance with the invention for converting printed English text into discrete phonetic symbols, ordered and concatenated, and then into control signals for a speech synthesizer. Printed text signal counterparts are developed at input unit 10 from any one of a number of alternative source systems. For example, text signals may be supplied from text reader 11, of a design to scan or otherwise analyze printed material to develop electrical signal counterparts. More conveniently, teletypewriter apparatus 12 is used directly to develop electrical signals representative of printed text material. It is, of course, possible to supply input unit 10 with signal information developed from a numerical word list, or from some other compact representation. Whatever the form of input signal data, input unit 10 supplies as its output a sequence of signals representative of textual input data.

These data are supplied to syntax analyzer 13. Analyzer 13 consults phoneme dictionary 14 and chooses a grammatical category, i.e., noun, verb, preposition or the like for each word in the input sequence. It also assigns a phrase category, i.e., the role of each word in the sentence, such as subject, object or the like. Dictionary 14 is equipped to store equivalent signal information corresponding to a selected large vocabulary of words or phrases and variations of them. Thus, each word may be stored in a number of different forms reflecting alternative pronunciations, usages and the like. It contains, in addition, a phonemic transcription of each word with lexical stress indications and a coded indication of possible usages of each word in a phrase. In selecting a word from dictionary 14, sentence analyzer 13 withdraws the appropriate form of the described word.

Operations of syntax analyzer 13 are well known to those skilled in the art. Several suitable analyzers have previously been described. A typical analyzer comprises, for example, a logic tree in which words in the input are examined and an assignment is made in accordance with the logical structure of the unit. Each state in a sentence is thus represented in the logic tree and each branch in the tree is matched to a word in the input sequence for identification. For example, the junction at the end of a subject constitutes a branch in the tree structure. As each word is defined, the next word is examined to determine if it is a part of a verb, a continuation or, if it is none of them, the next most likely use in the word group.

Alternatively, the decision logic may be contained in a relatively small program operating as a matrix in which rows represent defined states and columns represent the present word class being incorporated into the description of the sentence. For example, a row may specify that a subject has been found and that a verb must next be found. With similar structured logic instructions, each word in the sentence is identified according to its syntactical use in the sentence. Based on these assigned grammatical relationships, a number of syntactical assignment signals are developed by analyzer 13.

At the boundary of each pair of words, pause probability analyzer 15 next developes a signal to represent the probability, or the potential for, a break or pause between each pair of words. One of the signals developed by the analyzer denotes the phrase category. For example, seven categories are established as follows:

TABLE (1)

| Category | Explanation |
|---|---|
| E | Introductory exclamation; introductory question indicator (interrogative pronoun, verb) |
| I | Introductory clause |
| S | Subject with all modifiers |
| V | Verb with modifying adverbs |
| O | Object-direct and indirect; predicate nouns and adjectives |
| T | Trailing prepositional phrases |
| P | Punctuation |

Assignment of pause probability depends on the phrase category of the two words. Words in the same phrase are assigned a zero probability of a break. Break probabilities of higher value are assigned between subject and predicate, than between verb and object or complement. Break probability is made relatively high between an introductory prepositional phrase and the subject. Any reverse order of occurrence among phrase categories gives rise to an indication of a clause boundary at the reverse point. Clause boundaries are given a higher probability of a break than any phrase boundary within the clause. Finally, punctuation marks are given the highest probabilities of a break.

These operations are implemented, for example, by using stored numerical values for each phrase category, i.e., for each category set forth in Table (1) above. A pause probability value is extracted from a table on the basis of two symbols, one for the preceding and the one for the following word. An example of such a tabular representation is shown below in Table (2).

TABLE (2)

| Present Word Category | | | | | | |
|---|---|---|---|---|---|---|
| E | I | S | V | O | T | P |

|  |  |  |  |  |  |  |  |  |
|---|---|---|---|---|---|---|---|---|
| Previous Word Category | E | 0 | 0 | 0 | 0 | 0 | 0 | 9 |
|  | I | 7 | 0 | 6 | 6 | 6 | 6 | 9 |
|  | S | 7 | 7 | 0 | 5 | 5 | 5 | 9 |
|  | V | 7 | 7 | 7 | 0 | 2 | 4 | 9 |
|  | O | 7 | 7 | 7 | 7 | 0 | 4 | 9 |
|  | T | 7 | 7 | 7 | 7 | 7 | 0 | 9 |
|  | P | 0 | 0 | 0 | 0 | 0 | 0 | 9 |

Pauses in the sentence are also based on the length of the sentence and its grammatical structure. Generator 16, together with analyzer 17, operates to place a pause at the most appropriate place in the sentence in accordance with the probability of a pause indicated by signals from analyzer 15. The assignment is done in two stages. A general pause is first assigned in generator 16 and subsequently translated into specific demands for pitch changes and vowel lengthening in analyzer 17. These values are then delivered to analyzer 19 and to generators 20 and 21, where they are combined with other demands and used to determine actual pitch, duration, and pause assignments. Table (3), below, summarizes both steps. It indicates the places at which pauses are to be assigned, and gives some indication as to how they are located. Finally, it suggests acoustic features associated with the several types of pause.

TABLE (3)

| Type of Pause | Method of Location | Acoustic Features |
|---|---|---|
| Sentence End | Period | Long Vowel, Falling Pitch, Silence. |
| Strongest Continuation | Questionmark in A yes-no Question | Very Long Vowel, Strong rising pitch, Silence. |
| Strong Continuation | Comma | Very Long Vowel, Rising Pitch, Silence. |
| Moderate Continuation | Clause Boundary Found by Analyzer | Long Vowel, Rising pitch |
| Weak Continuation | Clause Boundary Found by Analyzer | Moderate Vowel, Sustained Pitch |

The first three types of pauses indicated in Table (3) are detected in syntax analyzer 13. Signals defining them clearly as being category P pauses, i.e., punctuation pauses, from Table (1), are available at the output of analyzer 13. For these pauses, signals clearly marked to indicate a probability value of 9 are produced at the output of probability analyzer 15. Probability 9 values, as indicated in Table (2), indicate a definite pause in the utterance. The remaining two types of pauses, namely, moderate continuations, and weak continuations, must be forced into the sentence at points not clearly marked by punctuation. This may be done using the assignment values from analyzer 15 matched against a moving threshold or mask. A number of threshold values are established. They assume that an actual pause, or a break with a rising pitch contour, terminating without an actual pause, is assigned depending on the length of the sentence and the speech rate.

A sequence of these probability value signals may be stored as values of a table, such as those illustrated in Table (2), or they may be represented by vector values.

In either case, the values are examined to determine the greatest probable value in a group of word pairs which represent a complete phrase. The table and vector techniques are thus alternatives. Another satisfactory technique is to assign the same kind of pause at a given pause probability value. For example, for a probability value of 7, a moderate continuation is always assigned. At a pause probability value of 5 or 6, a weak continuation is used. The actual pause assignment at probability value 5 or 6 depends largely on whether the sentence is long or short, or whether speech is to be fast or slow.

Figure 2:
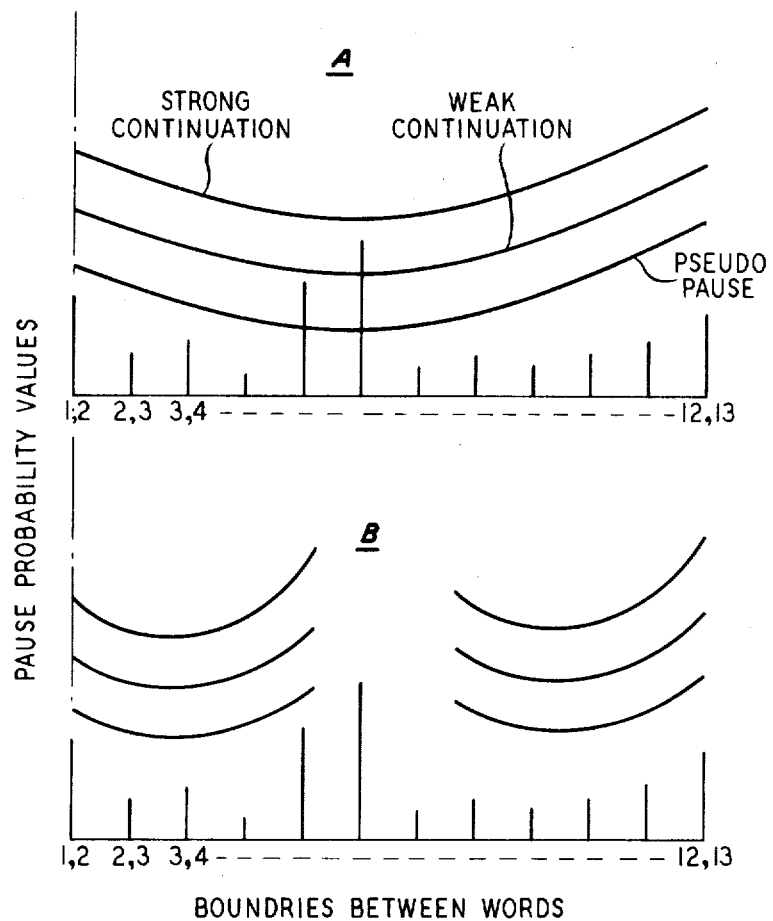
FIG. 2 illustrates a vector signal arrangement for identifying pauses in a sentence.

The vector technique is a somewhat more refined way of assigning pauses. As shown in FIG. 2, the probability value assigned to each word is indicated as one vector with the length of the vector indicating the probability value. The highest probability value for the sentence is indicated by the vector which exceeds a threshold level. Movable thresholds therefore are established for several degrees of pause. Vector height depends upon the length of the utterance. With a long utterance the threshold is lowered; with a short utterance, it is raised. The strength of the pause, whether it is a weak or strong continuation, is assigned according to the extent by which a vector exceeds the threshold. Alternatively, the extent of the threshold is examined, by way of an amplitude mask or the like, or it may be determined by some other length related critera, such as the number of content words located in the sentence. The threshold level normally is distorted at the ends of the phrase since it is desirable to inhibit the assignment of a pause near the end of a phrase. Pauses are already assigned to phrase ends by way of periods or other punctuation marks. Such an inhibiting or distorting technique corresponds to establishing curvature at the ends of the examination mask as illustrated in FIG. 2.

Only a single vector is allowed to indicate a pause in one examination of the phrase, i.e., the one that exceeds the threshold. Having indicated one pause, as illustrated in FIG. 2A, the two segments are reexamined, as shown in FIG. 2B, by shortening the length of the mask to fit the new segments. The procedure is carried out repeatedly until no new pauses are indicated.

It is of course evident that other techniques may be employed for selecting the largest assigned probability value defined for each word in entire phrase. Apparatus for picking the largest signal in a collection of signals is well known to those skilled in the art.

In selecting the largest probability value, by whatever means, it is also apparent that a lower limit must be established to prevent a pause from being assigned for peaks with a low probability value even though they exceed other low probability values. A very simple procedure permits pauses to be assigned without moving the threshold. By this alternative, no pauses are specified for probability values below a value of 5, even if they are determined to be the largest in the group. Pseudo-pauses are assigned for a probability value of 6 and 7 and real pauses are inserted for higher probability values. A pseudo-pause is defined as a change in output characterized by a weak pitch inflection at the end of an interval with some vowel elongation, and with other attributes of a pause. There is, however, no actual interval of silence, i.e., there is a slowdown but not an actual stop. Studies have indicated that such pseudo-pauses are very common in spoken English utterances. These values are determined and signals indicating them are produced by pause-group end pitch inflection analyzer 17. It relies on pause assignment signals from generator 16, in conjunction with stored rules of the sort discussed above.

The two following sentences illustrate, by way of example, the manner in which pauses are determined for a sentence. In the example, the pause probability values determined in pause probability analyzer 15 and, as indicated above, for punctuation values assigned by syntax analyzer 13, are shown for each word in the sentence.

EXAMPLES

```
2  2  2  3  4  56          6  6  6  64
```

On this page you see two examples of the seven categories[7].

```
1  3  44       5      6   6   7
```

Do you understand them after this?

The probability value for a pause between successive words, using the values of Table (2), are placed above each word of each sentence. Using the rules defined above, the pause is therefore indicated for each sentence. As discussed above, this is done by selecting the value from a table or by determining the largest vector value which exceeds the movable threshold.

REDUNDANCY EXAMINATION

During analysis, it is of course necessary to know whether or not a word has occurred previously in the paragraph. Redundancy analyzer 23 provides this information. Analyzer 23 maintains a list of words, typically a list with a maximum length of 100 words. Each time a new word is encountered during the analysis, the word is added to the list. If the number of words in the list then exceeds 100, the oldest word is deleted from the list. The analyzer then scans through the list seeking a match to the word that has just been added. If a match is found, the word is identified as present in the previous list of 100 words. In addition to keeping a list of words that have occurred previously in the paragraph, a secondary list is maintained of words that have occurred in the previous sentence. A similar matching procedure is followed for words in the secondary list. Analyzer 23 thus produces an output signal which indicates the status of each new word, i.e., it has not occurred previously, it occurred in the previous 100 words, it occurred in the previous sentence, or it occurred previously in the same sentence. These output indications are used in assigning stress indications to the textual material.

STRESS ASSIGNMENT

Independent from pause assignment in a sentence, a value of information that each word conveys in a paragraph as a constituent is assigned in analyzer 18 with reference to dictionary 14. This value of information is termed "stress." This term, however, has to be distinguished from the ordinary definition based on relativeness of perception. For speech generation, particularly in paragraph length material, subtle distinction of stress has been found necessary.

The word stress, therefore, is used herein as a rather specialized definition which might be termed "absolute stress."

Stress can be assigned from the usage of the word, e.g., noun, verb, preposition, or the like, or on the rarity of the word in the phrase. Common and repeated words are stressed less in common speech than are new and infrequently used words. For weaker words, such as function words, the degree of stress is very predictable from a knowledge of the word, and to a smaller extent is dependent on syntax.

For weaker words, such as function words, the degree of stress is very predictable from a knowledge of the word, and to a smaller extent dependent on syntax. Some of the polysyllabic function words like "inside" as opposed to "in," "beside" as opposed to "by," tend to receive more stress — possibly because they are selected for emphasis, possibly because they are polysyllabic, or possibly because they are less frequent.

Stress of content words appear to depend on the rarity of the word. Verbs as a class are more predictable than nouns and consistently receive lower stress. Among the verbs, infrequent ones are more heavily stressed than frequent ones, perhaps again because they are selected for emphasis, or possibly just because they are less frequent.

Certain frequent English verbs are used and stressed as be-verbs and auxiliaries. For example, verbs as "seem, look, get, turn, go" and so forth are very weakly stressed when they relate the subject to a compliment. For example, "The cake looks good." vs "He looks out the window a lot."

The stress of a noun depends on whether it has been mentioned before in the paragraph. Repetitions of a noun inside the sentence are often stressed as a function word, because it is used almost as a pronoun.

In all of these examples, stress on words that are more predictable from the context is reduced, but stress for usual words or unusual usages of common words is enhanced.

There is one special condition that is very different, however. This is the case of words such as "on" or "off," "in" or "out," used as an adjective. Even though these words are quite predictable from the context, their opposite alternatives are also quite likely and choice between the two is pivotal to the meaning of the sentence. This situation is detected by syntax analyzer 13.

Even though stress is generally continuous, a usable approximation may be obtained by quantizing absolute stress into three primary levels, e.g., function words, intermediate words, and content words.

Content words are further divided into sub-classes, namely, (1) noun or verb or others, and (2) new or repeated words. Function words, usually mono-syllabic, serve mainly to establish grammatical relationships in the sentence and are rarely stressed. Function words include articles, prepositions, conjunctions, and personal pronouns. Content words are words that convey substantial meaning in the sentence and are generally stressed. Content words relate to things, actions or attributes. There are also intermediate words that are neither function nor content. Poly-syllabic, less frequent prepositions, conjunctions, and frequently used verbs, such as "get," "take," "give," and so on, fall into this category, as do some pronouns, adverbs, and adjectives. Intermediate words generally receive a weak stress.

In addition to simple word-stress assignment, one of the content words in each pause group is usually treated in a special way to receive more stress and a special falling pitch at the end of its main vowel. In most sentences, this special stress falls on the main idea of the phrase. It is often termed the "focus" of the phrase. In English there is a strong tendency for the focus to occur on the last content word of the phrase, especially in factual material. In analyzer 19, for each pause group, the last word with absolute stress above the level of repeated nouns is assigned focus stress unless another word is specially marked for emphasis in the input text (for example by italics or underlining).

Indications of absolute stress, determined in unit 18 on the basis of information from syntax analyzer 13, are made available as signals indicating the stress of each word by unit 18. Similarly, the appropriate focus for the phrase is determined in focus word analyzer 19. Analyzer 19 is supplied with indications of absolute stress from unit 18 and with an indication of a pause-group end pitch inflection from analyzer 17. Analyzer 19 thereupon produces a signal indicating the focus of each pause group.

PITCH AND TIMING ASSIGNMENT

At this point in the analysis, a number of signals have been assigned to indicate the way in which a sentence is to be read. Signals have been prepared to indicate where pauses are to be placed, the kind of pitch inflection to be placed at each pause, which word is to be stressed, and how much stress is to be applied. While these representations are meaningful to a human, there remains the problem of interpreting these assignments in a fashion that is meaningful to machine apparatus. It is therefore necessary to translate these signals into timing control values, pitch values, and intensity values for each phoneme in the sequence of words. These translations are done by signal generators 20, 21, and 22.

The duration translations are carried out by two basic sets of rules. The first is a rule for consonant duration values and affords special treatment to phonemes at the end of a word. This rule is implemented in signal generator 22. Another rule applies to vowel duration values and pitch values for vowels, and gives special treatment to the pre-pausal main vowel in a word. It is applied in generators 21 and 20, respectively.

Figure 3:
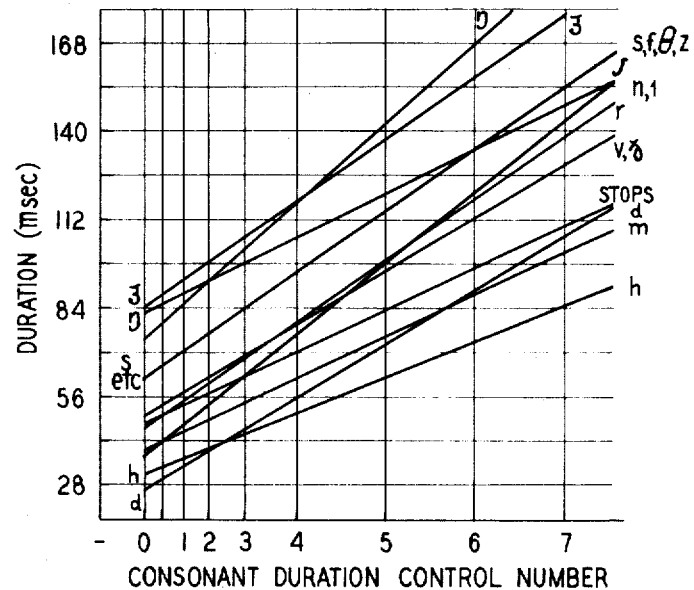
FIG. 3 is a chart setting forth consonant durations in terms of control numbers.
Figure 4:
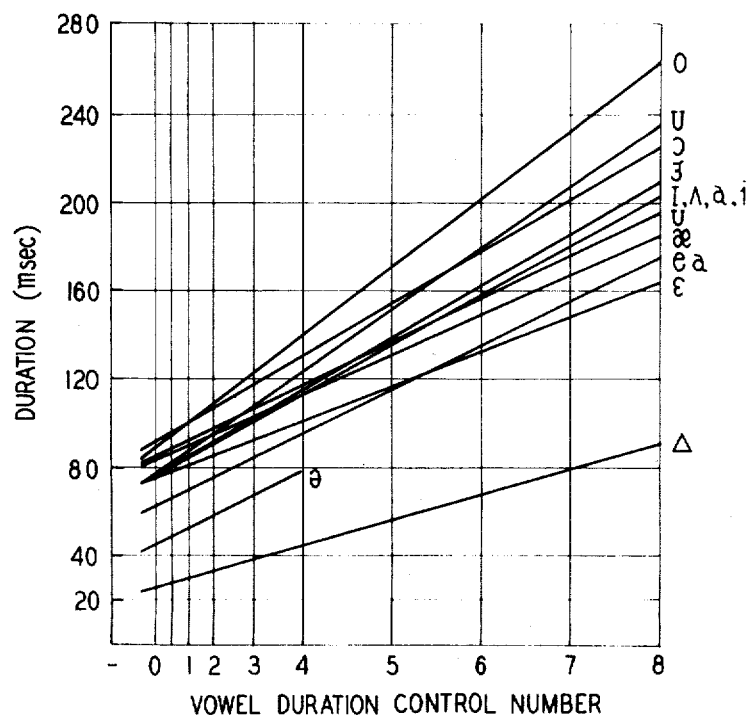
FIG. 4 is a chart setting forth vowel durations in terms of control numbers.

It is convenient in the duration and pitch assignment generators to establish a normalized value or control value independent of the actual value and, subsequently, to translate this control number into an actual value, for example, in parameter assignment apparatus 27. Apparatus 27 accordingly is equipped with a table of durations and pitch. For the duration of phonemes, two numbers are used for each phoneme, a fixed duration component and a variable duration component. The fixed and variable numbers define a point and slope for a straight line curve or duration as represented in FIGS. 3 and 4.

CONSONANT DURATION

Figure 5:
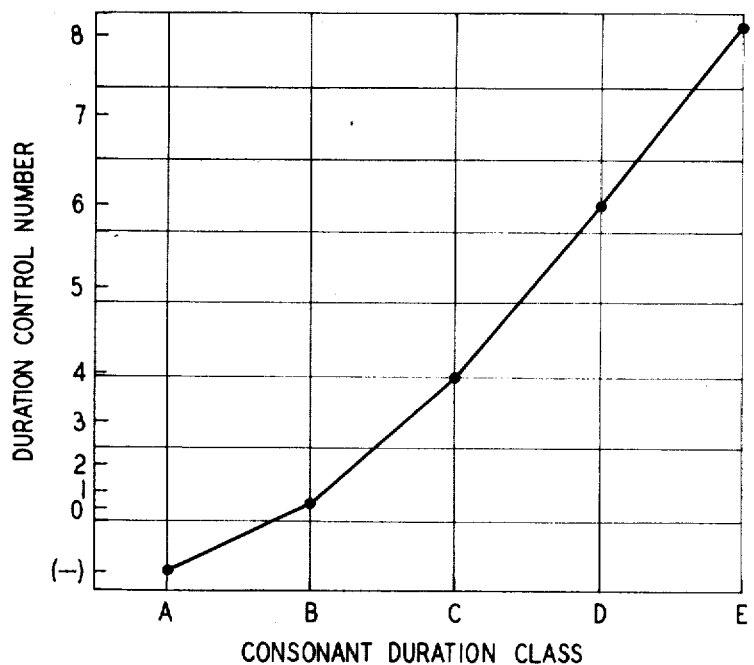
FIG. 5 is a chart which relates consonant duration class to duration control numbers, and to an approximate change from average duration values.

In analyzer 22, consonant durations at the ends of words are made dependent upon the stress assigned to the word. Heavily stressed words are set apart in the stream of speech by long consonants at their boundaries. Consonant duration generator 22 responds to the identity of a phoneme from dictionary 14. If the consonant is at either end of the word, the absolute stress on the word that it is in, and the stress on the adjacent word, either preceding or following, is assigned by generator 18. These three items of information are used to find a consonant duration class from a data table, for example, as shown in FIG. 5. Defining this class leads to a duration control number as shown in FIG. 5 and ultimately to the actual duration. The approximate duration change for each class is also shown in FIG. 5. Exact duration values are obtained by translating the duration control numbers to actual duration values, in milliseconds, via FIG. 3.

In FIG. 5, condition A indicates a post-stress intervocalic, tongue tip consonant occurring inside a word. Condition B applies to other consonant indicia words and function-word boundaries. Condition C denotes stressed constant inside words at the end of an intermediate-stressed word, at the boundary between words of a compound or some common expressions, and in function words adjacent to content words. Condition D indicates a content-word boundary, and condition E denotes syllabic consonants at phrase boundaries.

Thus, a function-word consonant adjacent to a content word is lengthened, e.g., from duration B to duration C from data in FIG. 5. When two nouns compose a compound word, consonants at their boundary are reduced in duration.

The above general rules apply for most cases, but further refinements may be used; i.e., a number of special cases may be accommodated by the system. For example, the words in a combination of a verb following an article or a pronoun are given shorter consonants at their boundaries than other content function combinations, according to information from syntax analyzer 13. Other special cases of consonant durations will be described below in the discussion of special cases of vowel assignments made by generator 21.

VOWEL DURATION AND PITCH

Vowel duration and vowel pitch assignment represent two different aspects of control in voice production. Vowel duration generator 21 and pitch and intensity generator 20 therefore respond to the same signals from dictionary 14, from stress generator 18, from focus stress analyzer 19, and from pause group analyzer 17. The entire process of developing duration and pitch values on vowels is essentially a table extraction process in which incoming information is used to develop an address in a table. From the addresses in the tables, duration values, pitch values, and intensity values are extracted.

Generator 21 incorporates a number of tables of vowel duration values. For each vowel, therefore, the stress and pause signals lead to the assignment of an appropriate duration value from a stored table. The tables themselves are based on a consideration of vowel duration usage in common speech.

The rules of vowel duration are much more complex than those for consonants. Durations of vowels are affected by stress even more than those of consonants.

At the same time they are affected by several other factors. Vowel intensity (for stress) and pitch change across the vowel (for termination) affect the phoneme duration very much. The lexical stress of the syllable in which the phoneme occurs is another factor. What phoneme is preceding or following is a third. Each vowel responds differently to these factors. Moreover, individual phonemes interact with specific phonemes in very special ways. For instance, a syllable-final nasal, when preceded by a front or central lax vowel, shortens the vowel and lengthens itself. This phenomenon, nasal assimilation, is fairly well known. The vowel "a" as in hat, when followed by "s," is very long in monosyllabic words, but not in polysyllabic words.

Vowel duration generator 21 makes a number of intermediate decisions, including a determination of:
1. the lexical stress status of the vowel obtained in dictionary 14; whether it is primarily stressed, secondarily stressed, or unstressed;
2. whether it is in the word-final syllable; and
3. if so, whether it is in the pre-pausal position.

Figure 6:
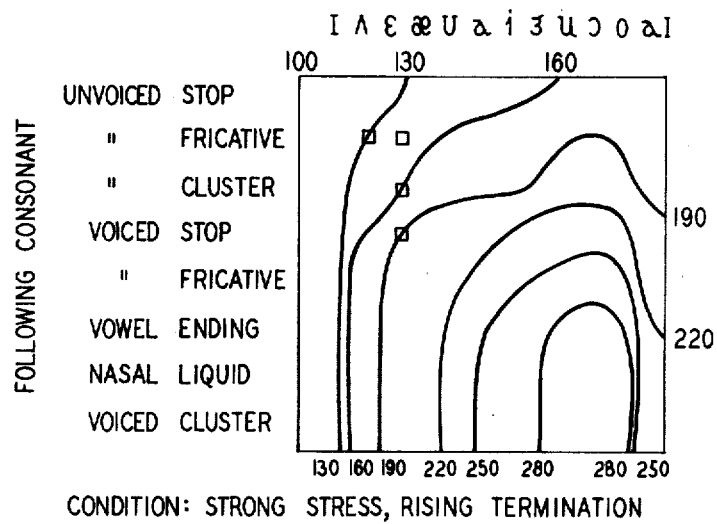
FIG. 6 illustrates one of a number of charts which tabulate vowel duration as a function of the following consonant.

FIG. 6 shows duration values for a number of vowels as functions of the consonants that follow it, for a representative condition, namely, tonic word, strong stress, strong rising pause group ending on the main vowel of the word. Durations are represented as contour lines in a spatial array of vowels and consonants. These contours are somewhat smoother than corresponding data tables. FIG. 6 is but one of a number of sets of data. These data correspond to that tabulated in FIG. 7.

The assignment of vowel duration proceeds as follows. The conditions of pause-group ending, whether or not the word is a focus, and the absolute stress assigned to the word are used to find a position in FIG. 7, which then leads to other stored tables which give the duration control values as a function of the vowel and the kind of consonant that follows. These tables are shown in FIGS. 9 through 15.

Pitch and intensity values are assigned in signal generator 20, using essentially the same technique employed in assigning duration values for vowels described above. Thus, unit 20 receives the same data from dictionary 14, stress generator 18, and so on. Depending upon the input data supplied to signal generator 20, a pitch and intensity value is assigned for each phoneme from stored tables. FIG. 8 illustrates the method of assigning pitch.

The vertical and horizontal axes of the table are identical to those of FIG. 7. The values inside the table are control values of pitch or fundamental frequency in cycles per second. Some of the entries in the table have one value, some have two values, and some have three. Where the entry has one pitch value, that pitch is selected as the target pitch for the entire duration of the phoneme. Where there are two values, the phoneme is broken in two equal parts, with the higher pitch value held for the first half of the phoneme and the lower held for the second. Where there are three entries in the table, there are two alternatives. If the word ends in a voiceless consonant or silence, the vowel is broken into three parts with the pitch values in the table taken in order, the upper value first, the middle one second, and the bottom value third. If, however, a voiced phoneme follows, the bottom entry is used as the pitch of the voiced phoneme following the vowel, even if it is a constant. Two duration control numbers appear in some boxes in FIGS. 9 through 15. These indicate the vowel definition for pitch values.

There are several alternative ways of generating the actual pitch signal. For example, some synthesis methods have used sustained pitch throughout the duration of each phoneme with a short, smooth transition to the next phoneme. Others have connected from one specified pitch to another with straight-line interpolation. In accordance with this invention, a low-pass filter preferably is used to smooth the pitch. The rise time of the filter is selected to be slow compared to the average duration of a phoneme and typically is on the order 300 milliseconds to go from ten percent to ninety percent of the full change. The pitch values shown in FIG. 8 represent target values for pitch. However, the filter response is such that a supplied signal does not actually reach the target value but approaches it until the time for the next pitch value to be supplied. Thereupon, the view signal value moves toward the target value.

There are at least two alternative techniques for assigning intensity values. The simplest technique is to make intensity proportional to pitch. Another alternative is to find intensity values from a table very similar to the one shown in FIG. 8, but in which the entries represent intensity values. In general, intensity values are correlated with pitch values but are not necessarily proportional to them.

Following the assignment of pitch and intensity values and duration values to all phonemes, as discussed above, signals derived essentially from stored tables are thereupon delivered as an output signal together with the signal representing the phoneme itself. This output string of signals representing pitch, duration control, intensity, and phonemes, constitutes a detailed phonetic description sufficient to control the synthesis of artificial speech. It can be used directly for the generation of artificial speech or can be placed in storage for later utilization, for example, upon command.

Accordingly, these data are delivered by way of switch 24 either to detailed phonetic store 25, or to synthesizer apparatus 32. If the information is placed in store 25, it may be read out at a later date in response to a message command from unit 26 and thereupon delivered to parameter assignment apparatus 27. Apparatus 27 responds and selects parameter symbol data from its internal store and matches the resulting symbol data to parameter data in store 28. Apparatus of this sort, i.e., synthesizer apparatus employing stored parameter symbols and responsive to typewriter input signals, is well known to those skilled in the art. Numerous units have been described in the patent and general literature.

Suffice it to say, the detailed phonetic description is assembled in unit 27 to form a sufficient description of the commanded message to permit synthesizer control signals to be generated in control unit 29. The exact construction of control unit 29 depends, of course, on the form of synthesizer being used. Speech synthesizer 30 thereupon translates parameter data supplied from control 29 into an analog voice signal which may be used as desired, for example, to produce an audible output from loudspeaker 31. Obviously these acoustic analog signals may be recorded or otherwise displayed, e.g., in spectrographic form, for any desired use.

The above-described arrangements are, of course, merely illustrative of the application of the principles of the invention.

The invention has been described herein essentially in terms of its implementation using a combination of individual electronic elements and systems. It may, of course, be implemented for practice on a general-purpose computer programmed in accordance with the described rules and operations, or on a dedicated computer. With a programmed implementation, the data set forth in the Tables and Figures of this specification are stored in the computer and called by the program. Indeed, the programmed implementation of the invention has been found to be a most convenient and economical way of practicing the invention. Numerous other arrangements may be devised by those skilled in the art without departing from the spirit and scope of the invention. For example, instead of developing synthesizer control signals from stored phonemic symbols, as from dictionary 14, it is also in accordance with the invention to develop control signals from stored tables of parametric word descriptions including, for example, formants or channel vocoder signals. In this case, parameter assignment unit 27 scales the length of parameter signals to match the total word durations assigned by generators 21 and 22.

What is claimed is:

1. A system for converting printed data into artificial speech which comprises, in combination:
    means for converting printed material into alphanumeric signal data;
    means for analyzing said alpha-numeric data to determine a syntactical phrase category for individual word designations therein;
    means responsive to said syntactical data and to stored rules for assigning parametric values, including pause, stress, duration, pitch, and intensity values, for individual words in said alpha-numeric data;
    means responsive to said parametric valves for assigning individual phonetic values, including phoneme, duration, and pitch values, to said word intervals; and
    means responsive to said phonetic values for developing a continuous description of said alpha-numeric data as the energizing source of control signals for a speech synthesizer.

2. A system as defined in claim 1, in further combination with:
    means for storing said parametric values for selected printed data; and
    means responsive to a command signal for delivering said stored parametric values to said means for assigning individual phonetic values thereto.

3. A system for converting printed text into speech sounds, which comprises:
    means for converting printed text material into alpha-numeric signal data;
    means for examining the syntax of said alpha-numeric data to assign an appropriate phrase category to each word in said text material;
    means responsive to said phrase category assignments for assigning a pause probability value for each word boundary in said material;
    means responsive to said alpha-numeric data, to said phrase category assignment values, and to said pause probability assignments for developing signals representative of pauses in said text material;
    means responsive to said alpha-numeric data, to the syntax of said data, and to said pause signals, for developing signals representative of duration, pitch, and intensity values of each word in said material;
    means responsive to said assigned values for selecting a corresponding phonetic description of each word of said material from a dictionary of stored phonetic descriptions of words; and
    means responsive to stored rules for converting said selected phonetic descriptions into synthesizer control signals.

4. A system as defined in claim 3, wherein said means for developing signals representative of pauses in said text material comprises:
    means for representing said pause probability values for each word as a proportioned value signal;
    means for detecting the largest of said probability value signals in a selected sequence of alpha-numeric signal data; and
    means for developing a signal representative of said largest detected signal value as a representation of a pause of said text material.

5. A system as defined in claim 3, wherein said means for developing signals representative of pauses in said text material comprises:
    means for representing said pause probability value for each word as a proportioned value signal;
    means for establishing a variable threshold whose value is related to the length of selected alpha-numeric signal sequences; and
    means for developing a pause representative signal for the word denoted by that proportional signal value that exceeds said threshold value.

6. A system for converting English text into artificial speech control signals, which comprises, in combination:
    a dictionary of signal information corresponding to a selected large vocabulary of words and phrases and variations of them;
    means responsive to signal counterparts of printed text and to said dictionary signal information for assigning a syntactical grammatical phrase category to each individual word of said text;
    means responsive to said assigned categories, and to stored rules for developing signals representative of desired pauses at boundaries between words, phrases, and clauses in said printed text;
    means responsive to said dictionary signal information, said pause signals, and to stored rules, for developing signals representative of timing control values, pitch contour values, and intensity values for said individual words; and
    means responsive to said dictionary signal information and to said timing, pitch, and intensity value signals for developing a continuous signal description of said English text as the energizing source of control signals for a speech synthesizer.

7. A system as defined in claim 6, in further combination with:
   means for storing said continuous signal description of said English text, and
   command means for selectively withdrawing said stored signal description for delivery to a speech synthesizer.

8. A system for converting printed data into artificial speech, which comprises:
   means for converting printed data into textual signals;
   means for analyzing said textual signals to develop a syntactical phrase category signal for individual word designations therein;
   means responsive to said syntactical phrase category signals and to stored rules for assigning pause, stress, duration, pitch, and intensity values to individual words in said material;
   means for storing signals for a vocabulary of phonetic description of words and phrases, each in a number of different variations of pronunciation, usage, and grammatical form;
   means responsive to said assigned word values for selecting a corresponding phonetic description for each word of said printed material from said stored vocabulary signals;
   means responsive to said selected phonetic descriptions for developing a continuous signal description representative of said printed material as the energizing source of control signals for a speech synthesizer; and
   a speech synthesizer energized by said continuous signal description.

9. A method for converting printed material into artificial speech control signals which comprises the steps of:
   converting printed material into alpha-numeric signals,
   analyzing said alpha-numeric signals to assign a syntactical phrase category for individual word designations therein,
   assigning parametric values, including pause, stress, duration, pitch, and intensity values, for individual words in said alpha-numeric signals in dependence on said assigned syntactical phrase categories and on stored rules,
   assigning individual phonetic values to said word intervals in dependence on said assigned parametric values, and
   modifying said alpha-numeric signals according to said parametric values, said phonetic values, and said stored values, to produce a continuous signal descriptive of said printed material for use as energizing source of control signals for a speech synthesizer.

* * * * *